(12) United States Patent
Pedersen

(10) Patent No.: US 12,517,548 B2
(45) Date of Patent: Jan. 6, 2026

(54) SYNCHRONISED MULTI-PROCESSOR OPERATING SYSTEM TIMER

(71) Applicant: Nordic Semiconductor ASA, Trondheim (NO)

(72) Inventor: Frode Milch Pedersen, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 67 days.

(21) Appl. No.: 18/578,115

(22) PCT Filed: Jul. 11, 2022

(86) PCT No.: PCT/EP2022/069346
§ 371 (c)(1),
(2) Date: Jan. 10, 2024

(87) PCT Pub. No.: WO2023/285396
PCT Pub. Date: Jan. 19, 2023

(65) Prior Publication Data
US 2024/0319764 A1    Sep. 26, 2024

(30) Foreign Application Priority Data
Jul. 13, 2021  (GB) ..................................... 2110093

(51) Int. Cl.
*G06F 1/14*    (2006.01)
(52) U.S. Cl.
CPC ..................................... *G06F 1/14* (2013.01)

(58) Field of Classification Search
CPC .... G06F 1/14; G06F 15/7814; G06F 21/6281; G06F 21/71; G06F 1/3206; G06F 1/3237;
(Continued)

(56) References Cited

U.S. PATENT DOCUMENTS 5,822,381 A * 10/1998 Parry .................... G06F 1/10
  375/358
6,138,243 A * 10/2000 Mealey .................. G06F 1/14
  713/400

(Continued)

FOREIGN PATENT DOCUMENTS

CN    106 227 293 A    12/2016

OTHER PUBLICATIONS

International Search Report and Written Opinion for PCT/EP2022/069346, mailed Nov. 7, 2022, 28 pages.
(Continued)

*Primary Examiner* — Faisal M Zaman
(74) *Attorney, Agent, or Firm* — Klarquist Sparkman, LLP

(57) ABSTRACT

An integrated-circuit device comprises a plurality of processor cores and a system timer. The system timer includes a first oscillator that outputs a first clock signal at a first frequency, a first counter register incremented by the first clock signal and a plurality of event registers. Each event register triggers an event when a value held therein is determined to be equal to a value held in the first counter register. The first counter register is readable by each of the plurality of processor cores, and each of the processor cores are capable of writing to at least one of the event registers.

19 Claims, 6 Drawing Sheets

(58) Field of Classification Search
CPC . G06F 1/3287; G06F 1/04; G06F 1/10; G06F 1/12
See application file for complete search history.

(56) References Cited

U.S. PATENT DOCUMENTS

| | | | |
|---|---|---|---|
| 6,252,445 B1* | 6/2001 | Eidson | G04G 3/02 327/261 |
| 8,943,352 B1 | 1/2015 | Warneke | |
| 9,450,569 B1* | 9/2016 | Ansari | G06F 1/14 |
| 10,990,530 B1* | 4/2021 | Chanler | G06F 12/0895 |
| 2003/0037194 A1* | 2/2003 | Mukherjee | G09G 5/12 710/260 |
| 2008/0263380 A1* | 10/2008 | Dryer | G06F 1/14 713/400 |
| 2009/0248920 A1 | 10/2009 | Chaudhuri et al. | |
| 2013/0262911 A1* | 10/2013 | Boerger | G06F 1/12 713/502 |
| 2014/0281380 A1* | 9/2014 | Sodhi | G06F 9/30123 712/30 |
| 2018/0217947 A1* | 8/2018 | Rusten | G06F 13/26 |
| 2019/0079573 A1 | 3/2019 | Hanson et al. | |
| 2021/0124673 A1* | 4/2021 | Chirca | G06F 9/30116 |
| 2021/0181788 A1* | 6/2021 | Mishra | H04L 12/40019 |
| 2022/0269303 A1* | 8/2022 | Alcorn | H03K 19/17716 |
| 2024/0302884 A1* | 9/2024 | Pedersen | G06F 1/14 |

OTHER PUBLICATIONS

IPO Search Report under Section 17 for Great Britain Application No. 2110093.8, dated May 3, 2022, 5 pages.
International Search Report and Written Opinion for PCT/EP2022/069336, mailed Nov. 4, 2022, 28 pages.
IPO Combined Search and Examination Report under Sections 17 and 18(3) for Great Britain Application No. 2110092.0, dated Apr. 13, 2022, 12 pages.

* cited by examiner

SYNCHRONISED MULTI-PROCESSOR OPERATING SYSTEM TIMER

CROSS REFERENCE TO RELATED APPLICATIONS

This is the U.S. National Stage of International Application No. PCT/EP2022/069346, filed Jul. 11, 2022, which was published in English under PCT Article 21(2), which in turn claims the benefit of Great Britain Application No. 2110093.8, filed Jul. 13, 2021.

BACKGROUND

This invention relates to a system timer for an integrated-circuit (IC) device.

IC devices typically utilise one or more oscillators that output periodic clock signals which other components, especially processors, use for timing purposes. Commonly, registers and/or portions of random-access memory (RAM), coupled to an oscillator, are used to hold timing values that increment on a specific edge (e.g. rising or falling) of a clock signal. These timing values indicate the number of clock cycles that have occurred since the oscillators and registers and/or RAM were initialised. Components of IC devices (e.g. processor cores) can then use these timing values to determine timing information (e.g. time, date) as well as coordinate internal actions as well as external actions between a device and external devices in wired or wireless communication with it.

It is common for processor cores of IC devices to require an event, e.g. an interrupt signal, to be triggered at a particular point in time. In order to do this, a processor will typically store an event value in a computer-readable storage medium within the device (e.g. a register, RAM, etc.) that indicates a system time at which an event should trigger. An event will then be triggered when a system time held in a counter register or portion of RAM is determined, possibly by a processor core, to be equal to a stored event value.

It is also common for IC devices to comprise multiple processor cores. Each processor core needs access to a timing value in order to coordinate and time its own internal actions. It is common for each processor core to have its own register or portion of RAM dedicated to holding a timing value which it then uses as its system timer. Each processor core may have its own dedicated oscillator, though in some prior solutions oscillators are shared by a number of timing registers and/or portion of RAM associated with different processor cores.

Timing synchronisation between processor cores, and between kernels or operating systems (OS) running on the same or different processor cores, is an important consideration. This is especially the case where different processor cores keep track of their own system time independently. Prior art approaches include higher-level software-based synchronisation between system times of different kernels, OSs and processor cores. However, such solutions can be complex and computationally inefficient.

Embodiments of the present invention seek to provide more efficient mechanism for synchronising timing between processor cores.

SUMMARY OF THE INVENTION

When viewed from a first aspect, the invention provides an integrated-circuit device comprising:
a plurality of processor cores; and
a system timer comprising:
a first oscillator configured to output a first clock signal at a first frequency;
a first counter register incremented by the first clock signal; and
a plurality of event registers, each event register being configured to trigger an event when a value held therein is determined to be equal to a value held in the first counter register;
wherein
the first counter register is configured to be readable by each of the plurality of processor cores; and
each of the processor cores are configured to be capable of writing to at least one of the event registers.

Thus it will be seen that, in accordance with the invention, an IC device is provided with a system timer that is shared by each processor core of the device. In this way, synchronisation between system times of different processor cores is easily achieved, as each processor core shares the same system time (i.e. the value held in the first counter register). This has the advantage of reducing computational burden on processor cores during inter-core communications: there is no need to convert from the system time of one processor core to the system timer of another processor core (which may require one or more processor cores to perform one or more calculations). In this way, the power consumption of devices in accordance with the invention may be slightly reduced, and more importantly the efficiency of inter-processor core communications may be increased, thus improving overall computational efficiency and reducing software overhead in devices in accordance with the invention. In a set of embodiments, the plurality of processor cores are configured to treat the value held in the counter register as their main system time.

Furthermore, each of the processor cores are able to write to at least one event register in order to cause an event to trigger at a desired time in the future. In a set of embodiments, each event register is configured to trigger an event by generating one or more processor interrupt signals. An event may be triggered, for example, by generating an interrupt request (IRQ) or Programmable Peripheral Interconnect (PPI) signal. Such signals may be received by one or more of the processor cores and cause them to pause execution of a current thread and begin execution of an interrupt handler. PPI signals may be used for peripheral-to-peripheral signalling without requiring software intervention. As the system timer is shared by each of the processor cores, the plurality of event registers act as a central unit for triggering time-based events. As each of the event registers triggers in dependence on the value held in the same counter register (the first counter register), the process by which the processor cores write to the event registers may be standardised and simplified, again improving computational efficiency and reducing software overhead in devices in accordance with the invention.

In a set of embodiments, at least one event register is configured to be writeable by a plurality of the processor cores. This ensures that at least one event register is shared by a number of different processor cores. Such an event register may permit writing by processor cores of a given security level or greater, and prevent writing by processor cores under the given security level. Each event register may be associated with a specified type of event. In this way, devices in accordance with the invention may be able to control which processor cores are able to trigger which types of events.

In a set of embodiments, each of the plurality of processor cores is associated with a respective one of a plurality of owner identifications (IDs). In a set of embodiments, the device further comprises a computer readable storage medium comprising instructions for execution by one or more of the processor cores, each of the instructions being associated with one of a plurality of security settings. Each security setting may correspond to a particular security level. A particular owner or user may be associated with a respective combination of an owner ID and a security setting. The device may be configured to grant and/or deny certain permissions to certain owners or users based on the owner ID and security setting of that owner or user. This may allow devices in accordance with the present invention to execute instructions associated with a plurality of different operating systems and/or kernels, each associated with a specific combination of an owner ID and a security setting, and to control the permissions granted to each operating system and/or kernel.

In a set of such embodiments, at least one event register is associated with a respective owner ID and a respective security setting, wherein said event register is configured to be writeable to only by a processor core that is associated with said respective owner ID and executing instructions associated with said respective security setting. In this way, certain event registers may be dedicated to specific owners, indicated by their owner ID and security setting. This may allow timer resources to be allocated to different owners or users, thereby preventing owners or users from using timer resources allocated to other owners or users.

In a set of embodiments, at least one event register is associated with a respective owner ID and a respective security setting, wherein said event register is configured to be writeable to only by a processor core that is associated with said respective owner ID and executing instructions associated with a security setting corresponding to a security level greater than or equal to the security level corresponding to said respective security setting. Thus, owners with high security privileges (i.e. associated with security settings corresponding to a high security level) may be permitted to access event registers associated with lower security levels.

In a set of embodiments, at least one event register is configured to not be associated with any specific owner ID. As a result, ownership may therefore not enforced for said event register, and thus said event register may be shared by a plurality of different owners or users. The event register may be associated with a respective security setting and configured to be writeable only by a processor core executing instructions associated with a security setting corresponding to a security level greater than or equal to the security level corresponding to said respective security setting. Equally, the event register may be not be associated with any specific security setting and thus be writeable by any processor core executing instructions associated with any security setting.

In a set of embodiments, the device is configured, in response to a processor associated with a respective owner ID and executing instructions associated with a respective security setting attempting to read from or write to an event register that is not associated with said respective owner ID and said respective security setting, to prevent the read or write operation. The device may also be configured to generate an error message in this situation. In this way, owners and users may be prevented from interacting with event registers that are not allocated to them.

In a set of embodiments, the first counter register is mapped to two distinct aliases, each alias being readable by each of the plurality of processor cores. As used herein, the term "alias" is used to describe a memory address that is accessible by one or more processor cores that does not necessarily correspond to a physical register, but that from the perspective of a processor core effectively functions as a physical register. The first counter register may be mapped to an upper alias and a lower alias wherein the lower alias comprises a set of least significant bits of the first counter register and the upper alias comprises more significant bits of the first counter. In a set of embodiments, each processor core is configured to read the first counter register by performing a first read operation on the lower alias, and performing a second read operation on the upper alias. Mapping the first counter register to two distinct aliases in this manner is particularly advantageous in devices in which a system/data bus width (i.e. number of bits that can be simultaneously transmitted over a bus) is smaller than the width of the first counter register (i.e. the number of bits included therein). For example, a device may comprise as system/data bus with a width of 32-bits and a first counter register with a width of 52-bits. It will be appreciated that the first counter register may be mapped to more than two aliases—e.g. where the first counter width is more than twice the bus width—with additional read operations carried out accordingly.

In a set of embodiments, the upper alias of the first counter register for each respective processor core comprises an overflow bit indicative of whether or not the lower alias overflowed in a time period between the first read operation and the second read operation. The processor cores may be configured, if the value of the overflow bit is indicative of the lower alias having overflowed between the first and second read operations, to perform a third read operation on the lower alias, or to subtract one from the value read from the upper alias in the second read operation. The inclusion of the overflow bit in the first counter register therefore advantageously prevents invalid reads of the first counter register occurring as a result of the lower alias overflowing in between the first and second read operations.

The device may be configured to interleave read operations from different processor cores on the upper and lower aliases in order to enable more than one processor core to read the first counter register at substantially the same time. In a set of embodiments, the first counter register comprises a plurality of overflow bits, each overflow bit being associated with one of the plurality of owner IDs. The upper alias for each respective processor core may comprise only the overflow bit associated with the owner ID associated with that processor core. A processor core associated with one owner ID may therefore be prevented from reading the overflow bits associated other, different owner IDs. The inclusion of a plurality of overflow bits, each being associated with one of the plurality of owner IDs, enables each of the plurality of processor cores to read the first counter register without being hindered by any other processor cores reading the first counter register at substantially the same time.

Some prior art devices get around the issue of multiple processor cores attempting to access a counter register at substantially the same time by using physical shadow registers to which the most significant bits of a counter register are copied, with one shadow register being provided for each processor core. This is expensive in terms of cost (e.g. a bill-of-materials), computational efficiency and power consumption due to the numerous additional shadow registers required. Embodiments of the present invention set out above can reduce cost, increase computational efficiency and reduce power consumption when compared to such prior art devices by making use of aliases and overflow bits in this manner.

In a set of embodiments, the system timer further comprises a count offset register for storing a configurable count offset value and configured to be writeable by at least one of the processor cores. The system timer may further comprise a summing circuit portion configured to sum a value held in the count offset register and the value held in the counter register, and to write a resultant value to at least one of the event registers. This has the distinct advantage of reducing the number of read operations performed on the first counter register required in order to write to an event register, thereby increasing computational efficiency and reducing software overhead in devices in accordance with the invention. Each of the processor cores may be configured to write to an event register by writing a count offset value to the count offset register and transmitting a signal indicating the event register to be written to.

In a set of embodiments, the system timer comprises:
a high-resolution timer comprising the first oscillator and the first counter register; and
a low-resolution timer comprising a second oscillator configured to output a second clock signal at a second frequency and a second counter register incremented by the second clock signal, the second frequency being less than the first frequency;
wherein
the device is configured to operate in one of a plurality of states, the plurality of states comprising:
an active state in which both the high-resolution timer and the low-resolution timer are enabled; and
a sleep state in which the high-resolution timer is disabled and the low-resolution timer is enabled; and
the device is configured to transition from the sleep state to the active state, said transition comprising writing a value to the first counter register based on a value held in the second counter register.

Thus it will be seen that the device may be provided with separate low-resolution, low-power and high-resolution, high-power timers, each timer featuring its own dedicated counter register. The low-resolution timer is enabled at all times while the device is powered, and the high-power timer is selectively enabled in dependence on the operational state of the device. The device is therefore able to continuously monitor timing using the low-resolution timer, and the high-resolution timer is only enabled when required. The device is then provided with a hardware-based mechanism for synchronising the high-resolution timer to the low-resolution timer when the high-resolution timer is enabled. In this way, the long-term timing accuracy of the device is determined by the low-resolution timer. There are no times when the device has no timer enabled, even for brief periods when transitioning from one state to another. This increases the long-term timing consistency of the devices.

In a set of embodiments, the second counter register is configured to not be readable by any processor core. Thus, each processor core may require the high-resolution timer to be enabled (i.e. the device operating in the active state) in order to read the current system time.

In a set of embodiments, the device further comprises a compare register configured to cause the device to trigger an event when a value held therein is determined to be equal to a value held in the second counter register. The compare register may be used by the device in order to cause an event to trigger at a desired time in the future, particularly when the device is in the sleep state and therefore only the low-resolution timer is enabled. The device may be configured to transition from the sleep state to the active state in response to the compare register triggering an event.

In a set of embodiments, the device further comprises a control register having a plurality of bits which are each associated with a respective owner ID and a respective security setting such that the respective bit is configured to be writeable to only by a processor core that is associated with said respective owner ID and executing instructions associated with said respective security setting.

In a set of embodiments, the device is configured to transition from the sleep state to the active state in response to one or more active conditions being met, the active conditions comprising:
any bit of the control register being enabled; and/or
any event register being written to; and/or
a value held in the compare register being determined to be equal to a value held in the second counter register; and/or
the first counter register being read.

Thus, it will be seen that as each combination of an owner ID and security setting is associated with a dedicated bit in the control register, any processor core executing instructions associated with any security setting is able to cause the device to operate in the active state. The remaining active conditions enable the device automatically to detect a selection of actions that may occur within the device that indicate that the high-resolution timer is required, and the device may respond accordingly by transitioning from the sleep state to the active state.

In a set of embodiments, the plurality of states further comprises a transition state in which both the high-resolution timer and the low-resolution timer are enabled, and in which the device is configured to determine whether to transition to the sleep state or to the active state. There may arise circumstances in which it is undesirable or inefficient for the device to switch from the active state to the sleep state—e.g. if it is likely that the device will be required to switch back to the active state within a short timeframe. The transition state enables the device to detect such circumstances before switching to the sleep state, when this would otherwise be indicated, and respond accordingly.

In a set of embodiments, the device is configured, when in the transition state, to:
determine a smallest value held in any of the event registers that is greater than the value held in the second counter register;
determine whether to transition to the sleep state in dependence on said smallest value; and
transition from the transition state to the sleep state, said transition comprising writing a value derived from the determined smallest value to the compare register.

Thus it will be seen that the device may be effectively configured to determine which of the event registers will trigger next, and ensure that the compare register holds a value that will trigger an event (and therefore transition to the active state), whilst the device is in the sleep state, at the same time as or before the next event register would trigger if the device had remained in the active state. Thus, the device ensures that it enters the active state before any of the event registers trigger, thus enabling the processor cores of the device to respond to events triggered by the event registers whilst the high-resolution timer is enabled.

BRIEF DESCRIPTION OF THE DRAWINGS

Certain preferred embodiments of the invention will now be described, by way of example only, with reference to the accompanying drawings, in which.

DETAILED DESCRIPTION OF THE DRAWINGS

Figure 1:
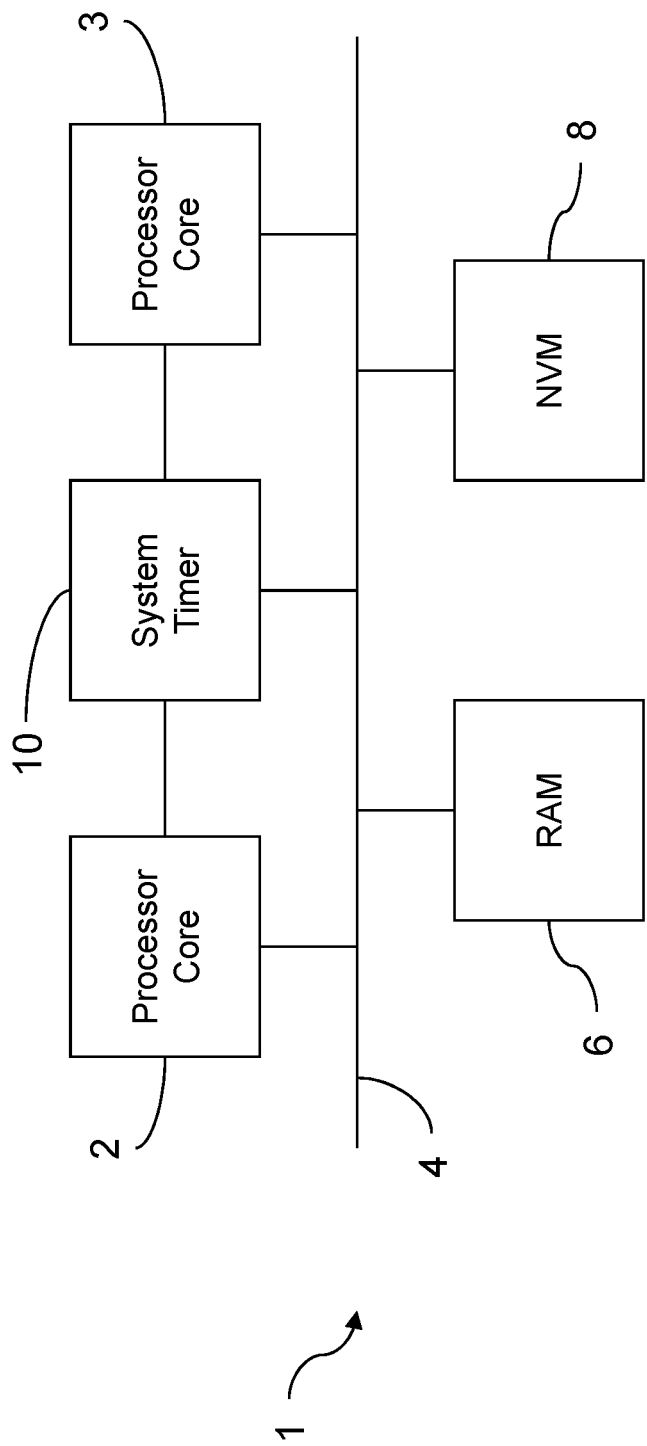
FIG. 1 is a schematic block diagram of an integrated-circuit (IC) system-on-chip (SoC) device comprising a system timer in accordance with an embodiment of the invention.

FIG. 1 shows a simplified schematic block diagram of an integrated-circuit (IC) system-on-chip (SoC) device 1 in accordance with an embodiment of the invention. The exemplary device 1 comprises two processor cores 2, 3, a system bus 4, a random-access memory (RAM) 6, a non-volatile memory (NVM) 8, and a system timer 10 in accordance with an embodiment of the invention. The device 1 may comprise further components which are not shown in FIG. 1 for the sake of brevity, e.g. read-only memory (ROM), radio transceiver circuitry for connecting to other devices over wireless connections, interfaces for connecting to other devices over wired connections (e.g. a serial peripheral interface (SPI)), etc.

The processor cores 2, 3 receive instructions held in the RAM 6 and/or NVM 8 over the system bus 4, and execute them. The processors 2, 3 are coupled to the system timer 10 which provides them with timing information and/or interrupt signals. Both processors 2, 3 share the same system timer 10. It will be appreciated that the device 1 may equally comprise only a single processor core, or it may comprise more than the two processor cores 2, 3 shown in FIG. 1.

Figure 2:
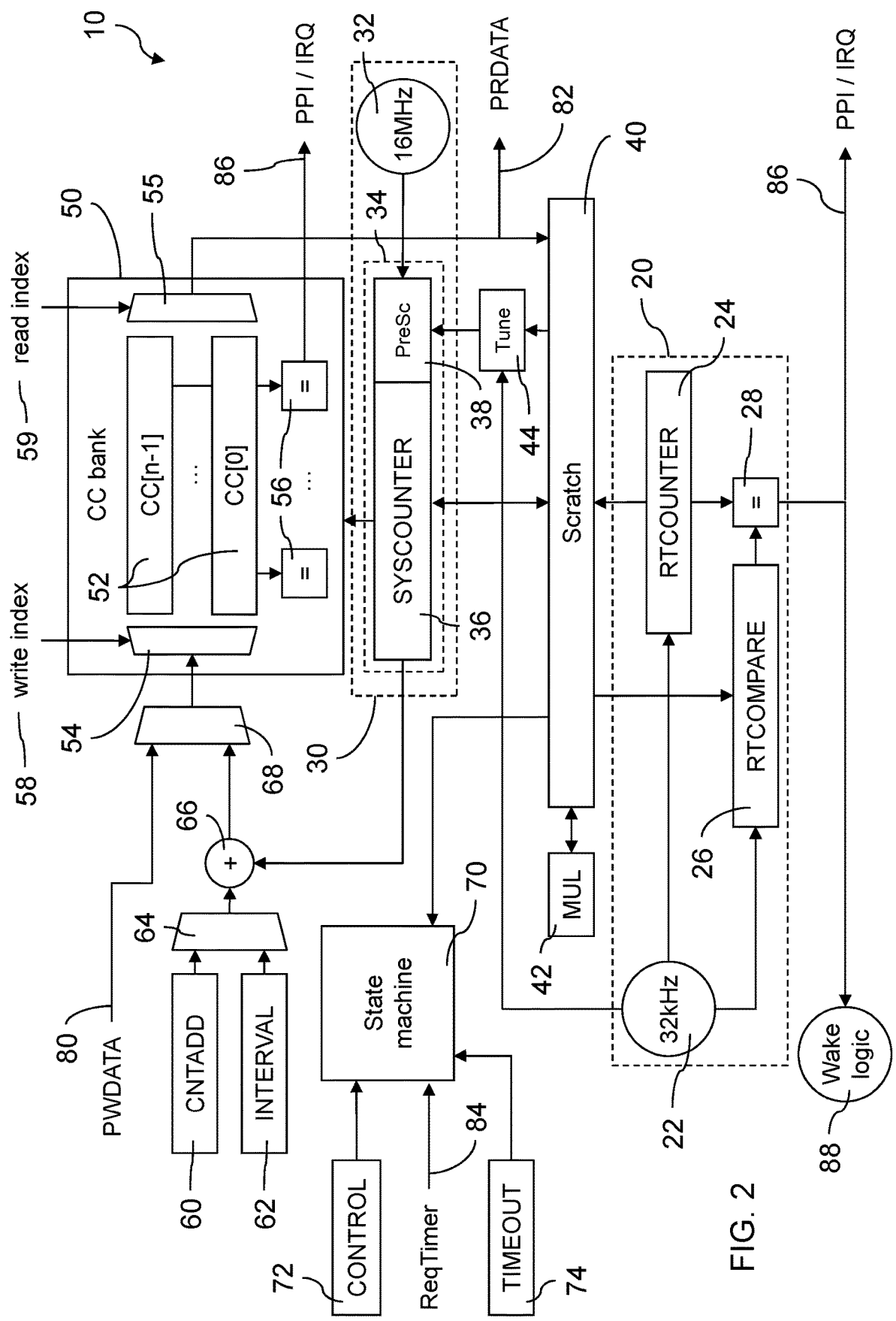
FIG. 2 is a schematic block diagram of the system timer.

FIG. 2 shows a schematic block diagram of the system timer 10. The system timer 10 comprises a low-resolution, low-power timer 20 and a high-resolution, high-power timer 30. The low-resolution timer 20 comprises a first oscillator 22, a first counter register (RTCOUNTER) 24, a first compare register (RTCOMPARE) 26 and a first comparison logic element 28. The high-resolution timer 30 comprises a second oscillator 32 and a second counter register 34. The second counter register 34 comprises an integer portion (SYSCOUNTER) 36 and a fractional portion (PreSc) 38. It will be appreciated that the integer portion 36 and the fractional portion 38 of the second counter register 34 may equally comprise individual registers rather than portions of the second counter register 34 as shown in this embodiment. The first oscillator 22 is a low-power oscillator that in this embodiment outputs a first clock signal at a frequency of 32.768 kHz (hereinafter referred to as the 32 kHz clock signal). In this embodiment the first oscillator 22 is a low-powered crystal oscillator, though it will be appreciated that the first oscillator 22 may equally be an RC or RL oscillator. The second oscillator 32 is a high-power oscillator, e.g. a crystal oscillator, configured in this embodiment to output a second clock signal at a frequency of 16 MHz.

The system timer 10 further comprises a scratch register 40, multiplier logic 42, and tuning logic 44. The scratch register 40 is used to temporarily hold one or more values required for one or more operations described herein. The multiplier logic 42 comprises one or more logic elements configured to perform bitwise operations on a value held in the scratch register 40. The tuning logic 44 comprises one or more logic elements for determining and outputting a tuning value based at least in part on a tuning value held in the scratch register 40 as will be described in further detail later.

The system timer 10 also comprises an event register bank (Capture/Compare CC bank) 50. The event register bank 50 comprises a plurality of event registers (CC[0] to CC[n−1]) 52. In this embodiment, the event register bank 50 comprises n event registers 52. The event register bank further comprises a write demultiplexer 54, a read multiplexer 55, and a plurality of comparison logic elements 56. In this embodiment, the event register bank 50 comprises n comparison logic elements 56—one for each event register 52. Each event register 52 is used to hold a value, and each comparison logic element 56 outputs a signal in response to a value held in its associated event register 52 being determined to be equal to a value held in the integer portion 36 of the second counter register 34. The write demultiplexer 54 receives a value as a digital signal at its input and writes it to an event register 52 indicated by a write index 58. The read demultiplexer 55 reads a value held in an event register 52 indicated by a read index 59, and outputs that value as a digital signal.

The system timer 10 further comprises a count offset register (CNTADD) 60, an interval register (INTERVAL) 62, a further multiplexer 64, summing logic 66 and another multiplexer 68. The system timer 10 further comprises a state machine 70, a control register 72 and a timeout register 74. In this embodiment, the count offset register 60 comprises an advanced peripheral bus (APB) alias rather than a physical register, and thus effectively functions as a register from the perspective of the processor cores 2, 3. In some embodiments, the interval register 62, control register 72 and timeout register 74 may also comprise APB aliases rather than physical registers. In this embodiment, however, the interval register 62, control register 72 and timeout register 74 each comprise physical registers rather than APB aliases.

The system timer 10 also comprises an input line 80 for receiving write data (PWDATA), an output line 82 for outputting read data (PRDATA), an input line 84 for receiving a timer request signal (ReqTimer), one or more output lines 86 for outputting Programmable Peripheral Interconnect (PPI) signals and/or interrupt requests (IRQ), and wake logic 88. These input and output lines 80, 82, 84 & 86 may be connected to the processor cores 2, 3, and/or to the system bus 4. PPI and IRQ signals, when received by a processor core 2, 3, may cause the processor core 2, 3 to pause or stop a thread currently being executed and instead execute an interrupt handler held in the RAM 6 or NVM 8. The wake logic 88 comprises one or more logic elements that cause the system timer 10 to enable the high-resolution timer 30 in response to receiving a signal from the comparison logic element 28.

A number of arrows are shown in FIG. 2 indicating some of the main signal paths between the various components of the system timer 10. However, these arrows are provided for ease of interpretation only and not intended to be limiting; any component shown in FIG. 2 may be connected to any other component, whether indicated by an arrow or not, in order to facilitate operation of the system timer 10 as described herein.

The operation of the system timer 10 will now be described in detail. The low-resolution timer 20 is enabled at all times when the system timer 10 is powered, including when the device 1 is switched off or on standby, while the high-resolution timer 30 is selectively enabled in dependence on which state of operation the system timer 10 is currently operating in. The states of operation in which the system timer 10 is configured to operate are described in further detail later with reference to FIG. 3. By having the high-resolution, high-power timer 30 be selectively enabled in this manner, the overall power consumption of the device 1 may be reduced.

The first oscillator 22 continuously outputs the 32 kHz clock signal. This clock signal is received by the first counter register 24, which increments the value held therein by one on each rising edge (tick) of the 32 kHz clock signal. In this way, the first counter register 24 effectively counts the number of ticks or periods of the 32 kHz clock signal that have occurred since the system timer 10 was first powered. The low-resolution timer 20 therefore has an effective resolution of 1/32,768=30.52 µs. The first counter register 24 in this embodiment comprises a 47-bit register and starts at zero upon each reset (e.g. power-off reset (POR)) of the system timer 10. As a result, no overflow detection is provided for the first counter register 24, as the 47-bit width of the counter 24 provides a roll-over time of approximately 136 years when paired with the 32 kHz clock signal output by the first oscillator 22.

When the high-resolution timer 30 is enabled, the second oscillator 32 continuously outputs a 16 MHz square wave clock signal. This clock signal is received by the second counter register 34. The fractional portion 38 of the second counter register 34 increments the value held therein by one on each rising edge (tick) of the 16 MHz clock signal. The integer portion 36 of the second counter register 34 increments the value held therein by one each time the fractional portion 38 overflows. In this embodiment, the fractional portion 38 comprises 4-bits of the second counter register 34, and the integer portion 36 comprises 52-bits of the second counter register 34. In this way, the integer portion of the second counter register 34 increments by one every one in sixteen rising edges of the 16 MHz clock signal, and thus effectively acts as a 1 MHz timer counter which can be considered to be clocked by an effective 1 MHz clock signal. The high-resolution timer therefore has an effective resolution of $1/10^6=1$ µs. The use of the 16 MHz clock signal and fractional portion 38 of the second counter register 34 enable the second counter register 34 to be tuned relative to the first counter register 24 without skipping forward or back, as will be described in further detail later. The integer portion 36 of the second counter register 30 acts as the main timer for the device 1, with the processor cores 2, 3 only being permitted to read the integer portion 36 of the second counter register 30. The processor cores 2, 3 are not permitted to read the fractional portion 38 of the second counter register, nor the first counter register 24.

In this embodiment, the system bus 4 comprises a 32-bit data bus. This prevents the processor cores 2, 3 from reading the entirety of the 52-bit integer portion 36 of the second counter register 34 within a single read operation. In order to compensate for this, the 52-bit integer portion 36 of the second counter register 34 is mapped to two different APB aliases (which from the perspective of the processor cores 2, 3 effectively function as registers as described previously): an upper alias SYSCOUNTERH corresponding to the most significant bits and a lower alias SYSCOUNTERL corresponding to the least significant bits. In order to read the integer portion 36 of the second counter register 34, the processor cores 2, 3 are required to read the lower alias SYSCOUNTERL in a first read operation, and then read the higher alias SYSCOUNTERH in a second read operation. However, as these two read operations are performed at slightly different times, there is the possibility that the lower alias SYSCOUNTERL will overflow after it is read but before the upper alias SYSCOUNTERH is read. If not compensated for, this leaves the possibility that the overall read of the integer portion 36 of the second counter register 34 is invalid.

In order to compensate for this, the upper alias SYSCOUNTERH includes an overflow bit as the most significant bit thereof. The overflow bit indicates whether the lower alias SYSCOUNTERL has overflowed between the first read operation of the lower alias SYSCOUNTERL and the second read operation of the upper alias SYSCOUNTERH by a processor core 2, 3. If the overflow bit has a value of '0', this indicates that the lower alias SYSCOUNTERL has not overflowed and therefore the overall value read from the integer portion 36 of the second counter register 34 using the two successive alias read operations is valid. If the overflow bit of the upper alias SYSCOUNTERL has a value of '1', this indicates that the lower alias SYSCOUNTERL has overflowed and therefore the overall value read from the integer portion 36 of the second counter register 34 using the two successive alias read operations is invalid. When this occurs, the processor core 2, 3 reading the integer portion 36 of the second counter register 34 is required to either perform a third read operation on the lower alias SYSCOUNTERL, or subtract one from the value read from the upper alias SYSCOUNTERH, in order to obtain a valid overall value of the integer portion 36 of the second counter register 34. When the upper alias SYSCOUNTERH is read, the overflow bit resets to '0'.

As each processor core 2, 3 operates independently, there is the possibility that multiple processor cores 2, 3 may read the integer portion 36 of the second counter register 34 at substantially the same time. The system timer 10 compensates for this by interleaving reads of the lower alias SYSCOUNTERL and the upper alias SYSCOUNTERH from different processor cores 2, 3. However, this implementation requires each of the processor cores 2, 3 to have their own dedicated overflow bit. In this embodiment, each processor core 2, 3 is associated with a respective one of a plurality of owner identifications (IDs), as will be described in further detail below, and a plurality of overflow bits are provided in the integer portion 36 of the second counter register 34 each associated with one of the plurality of owner IDs (and therefore one of the processor cores 2, 3). From the perspective of a given processor core 2, 3, the most significant bit of the upper alias SYSCOUNTERH comprises the overflow bit associated with the owner ID associated with that processor core 2, 3, and the overflow bits associated with owner IDs associated with different processor cores 2, 3 are not included in the upper alias SYSCOUNTERH. The system timer 10 determines which overflow bit to access for a given processor core 2, 3 when reading the upper alias SYSCOUNTERH based on its associated owner ID.

As the low-resolution timer 20 is always enabled while the system timer 10 is enabled, whereas the high-resolution timer 30 is selectively enabled by the system timer 10, long-term timing accuracy of the system timer 10 is determined by the low-resolution timer 20 and therefore the first oscillator 22. The high-resolution timer 30 is synchronised to the low-resolution timer 20 when it is enabled, as will be described in further detail later with reference to FIGS. 3 and 4. Furthermore, the high-resolution timer 30 is kept synchronised to the low-resolution timer 20 via a tuning mechanism, as will be described in further detail later. This helps increase the long-term timing consistency of the system timer 10, as long-term timing accuracy is governed by the low-resolution timer 20.

The process by which the high-resolution timer 30 may be used to generate PPI and/or IRQ signals for outputting over the PPI/IRQ output line 86 will now be explained in detail with reference to FIG. 2. Generating a PPI and/or IRQ signal is referred to herein as triggering an event. Each of the event registers 52 within the event register bank 50 holds a configurable value that may be written to by one or more of the processor cores 2, 3. The comparison logic elements 56 compare the value held in their corresponding event register 52 to the value held in the integer portion 36 of the second counter register 34 on each rising edge of the 16 MHz clock signal. These comparison logic elements 56 generate PPI and/or IRQ signals in response to a determination that a value held in an event register 52 is equal to the value held in the integer portion 36 of the second counter register 34. In effect, this means that the processor cores 2, 3 may write a value into an event register 52 in order to cause an event to trigger (i.e. a PPI and/or IRQ signal to be generated) at a specific point in time (i.e. a number of ticks of the effective 1 MHz clock signal) in the future. The system timer 10 will then automatically trigger the desired event when the integer portion 36 of the second counter register 34 reaches the count specified in the event register 52.

The event register bank 50 is able to simultaneously store up to n event values, one in each event register 52, and thus may be configured to trigger up to n different events without any of the event registers 52 needing to be overwritten. It will be appreciated that the event register bank 50 may trigger more than n different events while the high-resolution timer 30 is enabled, as each event register 52 may be overwritten with a different value once the corresponding event has been triggered.

Similarly, when the high-resolution timer 30 is disabled, the low-resolution timer 20 is able trigger events through the same mechanism of generating and outputting PPI and/or IRQ signals over the PPI/IRQ output line 86. In this embodiment, the compare register 26 holds a configurable value that may only be written to automatically by the system timer 10 itself. In other embodiments, the compare register 26 may be written to by e.g. a 'barebones', low-level processor of the device 1 (not shown). The comparison logic element 28 compares the value held in the compare register 26 to the value held in the first counter register 24 on each rising edge of the 32 kHz clock signal. The comparison logic element 28 generates a PPI and/or IRQ signal in response to a determination that the value held in the compare register 26 is equal to the value held in the first counter register 24. In addition to this, the comparison logic element 28 outputs a signal to the wake logic 88 in response to this determination. Each processor core 2, 3 is able to execute instructions stored in the RAM 6 or NVM 8. Different instructions may be associated with different operating systems (OSs), kernels and/or users, and instructions associated with these different OSs, kernels and users may be executed by one or both of the processor cores 2, 3 simultaneously or serially. It is desirable that the system time for both processor cores 2, 3, and for instructions associated with different OSs, kernels and/or users being executed by the same core, to be synchronised between each other. This allows a consistent system time across the processor cores 2, 3, and instructions they may execute. This consistent system time helps increase communication efficiency between the processor cores 2, 3 and between different OSs, kernels and/or users being executed by the processor cores 2, 3.

This synchronisation of the system time is achieved by having the integer portion 36 of the second counter register 34 be readable by each processor core 2, 3 regardless of which OS, kernel or user it is executing instructions associated with. This integer portion 36 of the second counter register 34 is the only counter register which the processor cores 2, 3 are permitted to read: the fractional portion 38 of the second counter register 34 and the first counter register 24 are configured not to be readable by any of the processor cores 2, 3. Furthermore, the first and second counter registers 24, 34 are configured to not be writeable by any of the processor cores 2, 3. Thus, the processor cores 2, 3 are only permitted to read the integer portion 36 of the second counter register 34, and the integer portion 36 of the second counter register 34 therefore acts as a common system time for all processor cores 2, 3 while they are active. This may help prevent accidental, or intentional, interference with the system timer 10 by the processor cores 2, 3.

In this embodiment, instructions stored in the RAM 6 or NVM 8 that each processor core 2, 3 may execute are each associated one of a plurality of security settings. Each security setting may correspond to a particular security level. Also, as described previously, each processor core 2, 3 is associated with a respective one of a plurality of owner IDs. The combination of an owner ID and a security therefore comprises a binary value that indicates which processor core 2, 3 is executing a set of computer-readable instructions, and the security setting associated with those instructions. Such a combination may therefore indicate a user or owner. In some embodiments, a user or owner may comprise a particular operating system (OS) or kernel. In this embodiment, the system timer 10 supports up to 16 unique combinations of owner IDs and security settings.

As the system timer 10 (specifically, the integer portion 36 of the second counter register 34) is shared by each processor core 2, 3—each processor core 2, 3 needs to be able to configure the system timer 10 to generate an interrupt (IRQ and/or PPI) at a desired time. In order to facilitate this, each processor core 2, 3 is able to write to at least one of the event registers 52. However, the system timer 10 needs to hold some level of control over which of the event registers 52 may be written to/overwritten by the processor cores 2, 3. Without such control, a first owner may be able to overwrite event registers previously written to by a second, different owner. This can cause problems, as an interrupt configured to occur by the first owner may be overwritten by the second owner and therefore be prevented from triggering.

In order to address this, one or more of the event registers 52 are associated with a combination of a respective owner ID and a respective security setting such that only a processor cores 2, 3 that is associated with said respective owner ID and executing instructions associated with said respective security setting may read from or write to that event register 52. In this embodiment, if a processor core 2, 3 is executing instructions associated with a security setting corresponding to a security level higher than a security level corresponding to the security setting associated with a particular event register 52, and the particular event register is associated with the same owner ID as the processor (or not associated with any owner ID), then the processor is still able to read from and write to that event register 52. In other words, a processor core 2, 3 executing instructions with a high security privilege may be able to read from and write to an event register 52 associated with a lower security level.

One or more of the event registers 52 may be not be associated with any owner IDs. As a result, ownership may not enforced for such an event register 52, and the event register 52 may therefore be shared by all or a plurality of different owners. Such an event register 52 may be associated with a respective security setting, in which case the event register is only writeable by processor cores 2, 3 executing instructions associated with a security setting corresponding to a security level greater than or equal to the security level corresponding to said respective security setting. Equally, such an event register 52 may not be associated with any security setting and thus be writeable by any processor core 2, 3 executing instructions associated with any security setting. One of the event registers 52 may be dedicated for triggering periodic events.

Attempts by a processor core 2, 3 that is associated with a respective owner ID and executing instructions associated with a specific security setting to read from or write to an event register 52 that is not associated with that owner ID and security setting will result in a read-as-zero or a write-ignore response, and may trigger an error signal.

The processes by which the event registers 52 may be written to and read from will now be described in detail. Each event register 52 is allocated a fixed address by the processor cores 2, 3. When a processor core 2, 3 attempts to write to an event register 52, it transmits the value to be written and the address of the register 52 to be written to over the write data input line 80. The system timer 10 then derives the write index 58 of the event register 52 that the value should be written to by performing combinatorial logic on the transmitted address. The system timer 10 then determines whether the derived write index 58 is valid—i.e. whether the owner ID (denoted by the processor core 2, 3 attempting the write operation) and the security setting associated with the instructions being executed by the processor core 2, 3 are also associated with the event register 52 at the derived write index 58—and responds accordingly. The value to be written to the desired event register 52 is transmitted over the write data input line 80 to the multiplexer 68, which then outputs the value to the write demultiplexer 54. The write demultiplexer 54 then writes the value to the event register 52 at the derived write index 58, if the write index 58 is determined to be valid.

Similarly, in order to read a value held in an event register 52, a processor core 2, 3 transmits the address of the event register that it wishes to read to the system timer 10 which then derives the read index 59 by performing combinatorial logic on the transmitted address. The system timer 10 then determines whether the derived read index 59 is valid—i.e. whether the instructions being executed by the processor core 2, 3 are associated with an owner ID associated with the processor core 2, 3 attempting the read operation and the security setting associated with the instructions being executed by the processor core 2, 3 are also associated with the event register 52 at the derived read index 59—and responds accordingly. If the read index 59 is determined to be valid, the read multiplexer 55 then reads the value held in the event register 52 at the derived read index 59, and outputs the value along the read data output line 82 to the processor core 2, 3.

The control register 72 comprises the same number of bits as there are possible combinations of owner IDs and security settings. Each bit of the control register 72 is associated with a respective owner ID and a respective security setting such that only a processor core 2, 3 that is associated with said respective owner ID and executing instructions associated with said respective security setting may set the value of that bit. The control register 72 is used by the processor cores 2, 3 to cause the system timer 10 to enable, or to keep enabled, the high-resolution timer 30. In this way, each owner (indicated by a combination of an owner ID and a security setting) may individually request the high-resolution timer 10 to be enabled, at any time. The function of the control register 72 will be described in further detail later with reference to FIG. 3.

With reference to FIG. 2, when a processor core 2, 3 writes to an event register 52 using the write data input line 80, the processor core 2, 3 itself is required to calculate the value to transmit to the system timer 10 based on the value currently held in the integer portion 36 of the second counter register 34. For example, if a processor core 2, 3 desires to have an interrupt trigger at five hundred ticks of the effective 1 MHz clock in the future, the processor core 2, 3 must first read the integer portion 36 of the second counter register 34, add five hundred to its value, and transmit the resultant value over the write data input line 80 to the system timer 10. When this process is being repeatedly executed by the processor cores 2, 3, this can lead to a very large number of read operations performed on the integer portion 36 of the second counter register 34, thereby increasing overhead. Furthermore, this may place unnecessary calculation burden on the processor cores 2, 3. This embodiment of the invention addresses this issue by providing another mechanism for writing to the event registers 52.

The count offset register 60 and interval register 62 provide this mechanism. Instead of transmitting a value to be written to an event register 52 over the write data input line 80, a processor core 2, 3 may write a count offset value to the count offset register 60. The count offset value comprises the number of ticks of the effective 1 MHz clock signal in the future that an event (e.g. an interrupt) should trigger. The value held in the count offset register 60 is then read by the multiplexer 64 and output to the summing logic 66. The summing logic 66 reads the value held in the integer portion 36 of the second counter register 34, and performs a series of bitwise operations in order to effectively sum this value and the value from the count offset register 60 it receives from the multiplexer 64. The summing logic 66 may comprise any appropriate logic elements in order to perform this function. The summing logic 66 then outputs the resultant value to the multiplexer 68, which then outputs the value to the write demultiplexer 54 which writes the value to the event register 52 at the derived write index 58 as described previously, if the write index 58 is determined to be valid as described previously. In doing this, the processor core 2, 3 is not required to read the second counter register 34: it simply needs to write the desired count offset to the count offset register 60, and the system timer 10 automatically writes the appropriate value to the desired event register 52.

In this way, the operational overhead of the device 1 required for the processor cores 2, 3 to read the integer portion 36 of the second counter register 34 and calculate an appropriate value to write to an event register 52 is reduced, thereby increasing the computational and power efficiency of the device 1.

The interval register 62 provides the system timer 10 with a mechanism for automatically generating a periodic event without requiring software interaction (i.e. interaction from the processor cores 2, 3). In this embodiment, one of the event registers 52 is dedicated for providing this periodic event functionality (e.g. event register CC[0]). An interval value may be written to the interval register 62 by a processor core 2, 3. This interval value is then read by the multiplexer 64 which then outputs the value to the summing logic 66. As described above, the summing logic 66 then sums the received value and the value held in the integer portion 36 of the second counter register 34, and outputs the resultant value to the event register bank 50. This value is then written to the CC[0] event register 52 dedicated for triggering periodic events.

When the comparison logic portion 56 associated with the CC[0] event register 52 dedicated for triggering periodic events triggers an event, the system timer 10 repeats this process of summing the interval value held in the interval register 62 and the value held in the integer portion 36 of the second counter register 34 and writing the resultant value to the same CC[0] event register 52. In effect, this results in the value held in this CC[0] event register 52 being set equal to the value it held previously plus the value held in the interval register 62, whenever it triggers an event. This gives CC[0] =CC[0]+INTERVAL on each trigger of CC[0]. This results in this event register 52 triggering a periodic event with the number of effective 1 MHz clock ticks between each trigger being equal to the value held in the interval register 62. The processor cores 2, 3 may write to the interval register 62 in order to change the interval between periodic event triggers. The processor cores 2, 3 may prevent further triggers of the periodic event by writing an interval value of zero to the interval register 62.

The CC[0] event register 52 dedicated for triggering periodic events may be associated a combination of a respective owner ID and a respective security setting in the same way as the other event registers 52, and therefore be writeable/readable only by a processor core 2, 3 that is associated with said respective owner ID and executing instructions associated with said respective security setting, in addition to providing the periodic event triggering functionality outlined above. The CC[0] event register 52 dedicated for triggering periodic events may not be associated with any specific owner ID and may therefore be writeable/readable by any of the processor cores 2, 3.

Figure 3:
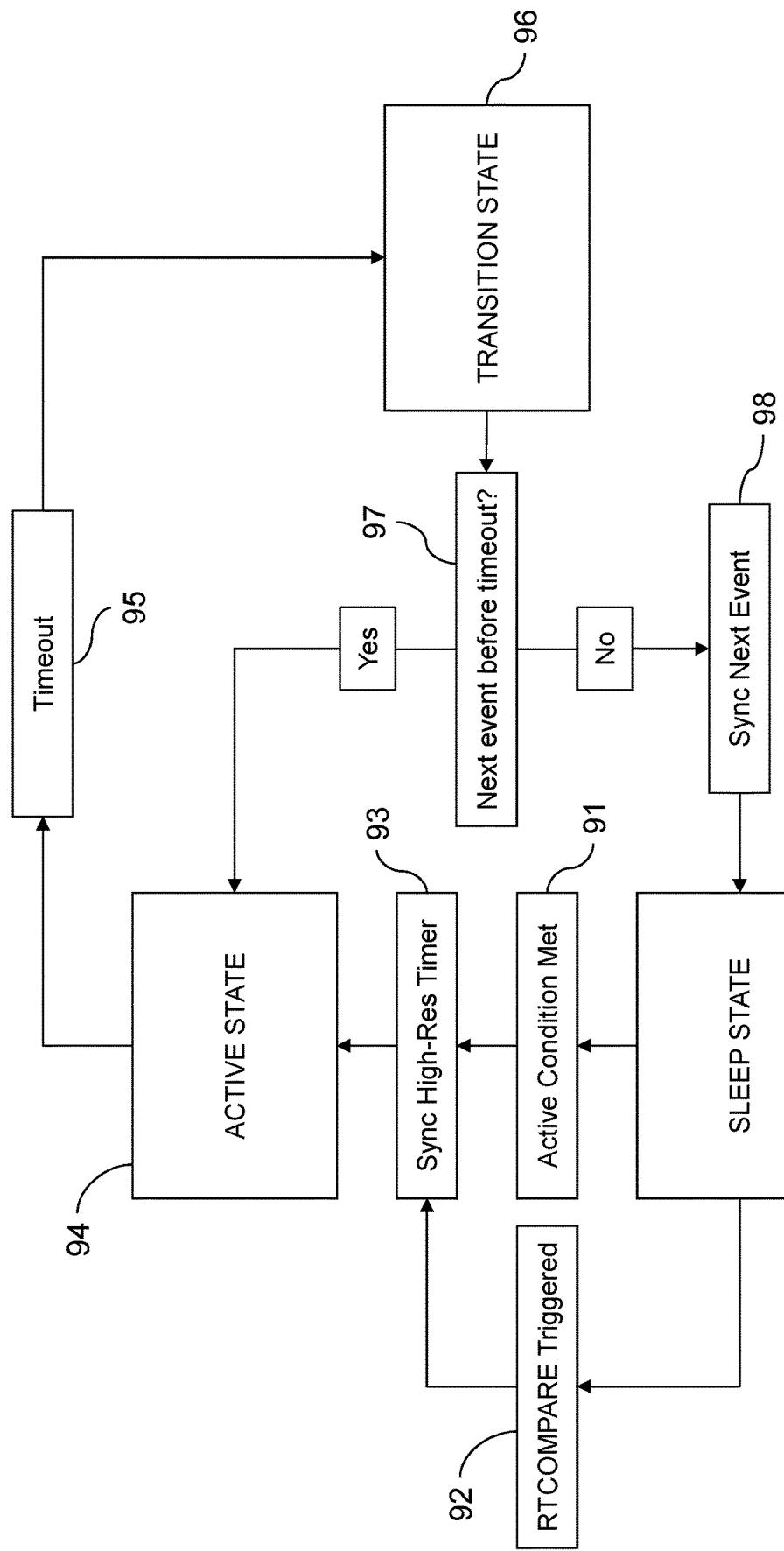
FIG. 3 is a schematic state diagram indicating modes of operation and transitions therebetween of the system timer.

FIG. 3 is a schematic state diagram indicating the operational states of the system timer 10 controlled by the state machine 70, and the possible transitions between these states. Effectively, the state machine 70 causes the system timer 10 to operate in one of three states: a sleep state 90 in which the low-resolution timer 20 is enabled and the high-resolution timer 30 is disabled; an active state 94 in which both the low-resolution timer 20 and the high-resolution timer 30 are enabled; and a transition state 96 in which both the low-resolution timer 20 and the high-resolution timer 30 are enabled and in which the system timer 10 determines whether to transition to the sleep state 90 or to the active state 94.

When the system timer 10 is in the sleep state 90, the state machine 70 causes the system timer 10 to wait for one of a number of conditions to be met and, when one or more of these conditions is met, to transition from the sleep state 90 to the active state 94 (i.e. to enable the high-resolution timer 30). These conditions will hereinafter be referred to as active conditions. When the system timer 10 is in the sleep state 90, none of the event registers 52 may trigger an event, as the second counter register 34 is prevented from incrementing whilst the high-resolution timer 30 is disabled. Therefore, when the system timer 10 is in the sleep state 90, only the compare register 26 of the low-resolution timer 20 may trigger an event, as described previously. The state machine 70 comprises an auto-engage status bit which, when set to active, indicates that the state machine 70 should respond to a signal being received over the timer request signal input line 84. If the auto-engage status bit is not set to active, the state machine 70 ignores signals received over the timer request signal input line 84. While the system timer 10 is in the sleep state 90, the overall power consumption of the device 1 is reduced as the high-power second oscillator 32 does not draw power.

The active conditions that cause the state machine 70 to cause the system timer 10 to transition from the sleep state to the active state include, but are not limited to: any bit in the control register 72 being set to active; the second counter register 34 being read by one of the processor cores 2, 3 or any other component of the device 1; any of the event registers 52 being written to; and, if the auto-engage status bit within the state machine 70 is set to active, a signal being received over the timer request signal input line 84. If a bit of the control register 72 is set to active, this indicates that the processor core 2, 3 that is associated with the owner ID associated with said bit and executing instructions associated with the security setting associated with that bit requires use of the high-resolution timer 30, and thus the system timer 10 should operate in the active state 94.

In the event of an attempt to read the second counter register 34 (e.g. by a processor core 2, 3), or if an event register 52 is written to (e.g. by a processor core 2, 3), then this indicates that the high-resolution timer 30 is required and therefore the system timer should operate in the active state 94. If the auto-engage bit is set to active, the state machine 70 treats a signal being received over the timer request input line 84 as an active condition. A signal is transmitted over the timer request input line 84 whenever a processor core 2, 3 is active (i.e. not in a processor sleep mode).

Figure 4:
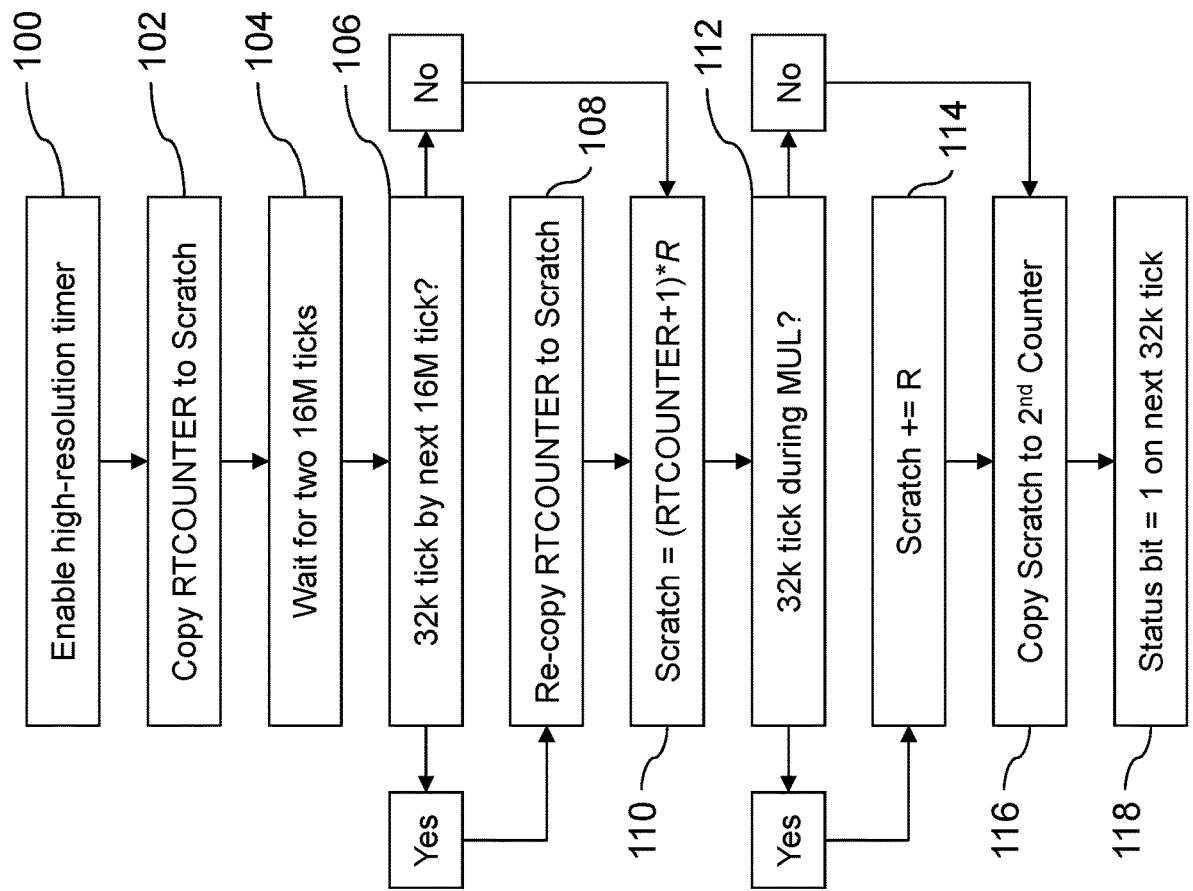
FIG. 4 is a flowchart illustrating the process by which the system synchronises a high-resolution timer to a low-resolution timer when the high-resolution timer is enabled.

The state machine 70 determines whether any of the above-mentioned active conditions are met when the system timer 10 is in the sleep state 90. When the state machine 70 determines that an active condition is met (step 91), it proceeds to enable the high-resolution timer 30 and synchronise the value held in the second counter register 34 to the value held in the first counter register 24 (step 93). The process by which this synchronisation process 93 is performed is described in further detail later with reference to FIG. 4. Additionally, when the compare register 26 triggers an event while the system timer 10 is in the sleep state (step 91), the wake logic 88 causes the state machine 70 to enable the high-resolution timer 30 and perform this synchronisation process 93 before entering the active state 94. Once the synchronisation process 93 illustrated in FIG. 4 is complete, the state machine 70 causes the system timer 10 to enter the active state 94. A status bit is provided for the second counter register 34 and is used to indicate whether the value currently held in the second counter register 34 (including both the integer portion 36 and the fractional portion 38) is valid, i.e. synchronised with the low-resolution timer 20.

The process by which the value held in the second counter register 34 is synchronised to the first counter register 24 (step 93 of FIG. 3) is illustrated by the flowchart shown in FIG. 4. At step 100, the high-resolution timer 30 is enabled. When the high-resolution timer 30 is enabled, the second oscillator 32 is powered up and begins outputting the 16 MHz clock signal.

At step 102, the value held in the first counter register 24 is copied to the scratch register 40. Then, at step 104, the system timer 10 waits for two ticks or periods of the 16 MHz clock signal output by the second oscillator 32 to occur. At step 106, the system timer 10 determines on the next tick of the 16 MHz clock signal whether a tick of the 32 kHz clock signal has occurred. If a tick of the 32 kHz clock signal has occurred, the system timer 10 proceeds to step 108. If not, the system timer 10 instead proceeds to step 110. At step 108, the value held in the first counter register 24 is re-copied to the scratch register 40 before proceeding to step 110.

Steps 104, 106 and 108 are included in the process of synchronising the second counter register 34 to the first counter register 24 because the state machine 70 does not know the phase of the 32 kHz clock signal. As a result of this, it is possible that a tick of the 32 kHz clock signal occurs at substantially the same time as the initial copy of the value held in the first counter register 24 to the scratch register 40 in step 102. This can result in a random (and therefore invalid) value being copied to the scratch register 40 e.g. as a result of a race condition. It is also possible that a tick of the 32 kHz clock signal occurs immediately after the initial copy of the value held in the first counter register 24 to the scratch register 40 in step 102. This would also result in an invalid value being copied to the scratch register 40: the value would not be the same as the value held in the first counter register 24, which would have incremented by one. Steps 104 and 106 cause the state machine 70 to check whether an edge of the 32 kHz clock signal has occurred, and, if so, step 108 causes the value held in the first counter register 24 to be re-copied to the scratch register 40. This ensures the validity of the value held in the scratch register 40: the phase of the 32 kHz clock signal becomes known as the state machine 70 has just detected an edge thereof, and thus the value held in the scratch register 40 is guaranteed to be equal to the value held in the first counter register 24 until the next tick of the 32 kHz clock signal, which will not occur for a long time relative to the much faster 16 MHz clock signal.

At step 110, the multiplier logic 42 performs a series of bitwise operations to the value held in the scratch register 40. The multiplier logic 42 adds one to the value held in the scratch register 40 and then multiplies the resultant value by a predetermined multiplicand equal to the ratio R between the frequency of the 16 MHz clock signal output by the second oscillator 32 and the frequency of the 32 kHz clock signal output by the first oscillator 22. This ratio R=16,000,000/32,768=488.28125. This operation effectively sets the value held in the scratch register 40 equal to (RT-COUNTER+1)*R.

At step 112, the system timer 10 determines whether a tick of the 32 kHz clock signal has occurred in the time taken for the multiplier logic 42 to perform the operation at step 110. If a tick of the 32 kHz clock signal has occurred, the system timer 10 proceeds to step 114. If not, the system timer 10 instead proceeds to step 116. At step 114, the frequency ratio R is added to the value held in the scratch register 40 to represent one 32 kHz tick in 16 MHz ticks. At step 116, the value held in the scratch register 40 is copied to the second counter register 34, including both the integer portion 36 and the fractional portion 38. Then, at step 118, the system timer waits for a tick of the 32 kHz clock signal before setting the status bit associated with the second counter register 34 to one, thereby indicating that the value held in the second counter register 34 is synchronised to the value held in the first counter register 24 and therefore valid. By synchronising the second counter register 34 to the first counter register 24 in this manner, the timing accuracy of the system timer 10 is determined by the low-resolution timer 20. This increases the long-term timing consistency of the device 1.

Turning back to FIG. 3, when the system timer 10 is operating in the active state 94, the state machine 70 continues to monitor whether any of the previously mentioned active conditions are met. While in the active state 94, a first portion of the scratch register 40 is used as a timeout counter register, and a second portion of the scratch register 40 is used as a tuning register. The first portion (i.e. the timeout counter register) may comprise 18-bits of the scratch register 40, and the second portion (i.e. the tuning register) may comprise 14-bits of the scratch register 40. The tuning register is used by the tuning logic 44 in order to tune the value held in the second counter register 34 as will be described in further detail later.

While one or more active conditions continue to be met during the active state 94, the value held in the timeout counter register is reset to, and remains at, zero. When the state machine 70 determines that no active conditions are met any longer during the active state 94, the value held in the timeout counter register increments by one on each tick of the 32 kHz clock signal. The state machine 70 compares the value held in the timeout counter register to the value held in the timeout register 74, which holds a configurable timeout value therein which may be set by the processor cores 2, 3. When the state machine 70 determines that the value held in the timeout register 74 is equal to the value held in the timeout counter register (step 95), it causes the system timer 10 to enter the transition state 96.

When the system timer 10 is in the transition state 96, the state machine 70 determines whether to transition back to the active state 94 or to transition to the sleep state 90. In order to do this, the state machine 70 determines which one of the event registers 52 will trigger next, and compares the value held in that register to the timeout value held in the timeout register 74 in order to determine whether the next event will trigger in less time than the number of 32 kHz clock ticks indicated by the timeout value (step 97). The process by which this comparison 97 is performed is described in further detail later with reference to FIG. 5.

If the state machine 70 determines that the next event register 52 will trigger in less time than that indicated by the timeout value, then it returns to the active state 94. If not, the state machine 70 synchronises the compare register 26 of the low-resolution timer 20 to the next event register 52 to trigger (step 98), before causing the system timer 10 to enter the sleep state 90. By featuring this transition state 96, the system timer 10 is prevented from transitioning to the sleep state 90 from the active state 94 at undesirable times which may cause the device 1 to operate with increased delay due to having to switch to the sleep state 90 and back to the active state 94, when it would have been more time-efficient to simply remain in the active state 94. The process by which the event synchronisation process 98 is performed is described in further detail later with reference to FIG. 6.

Figure 5:
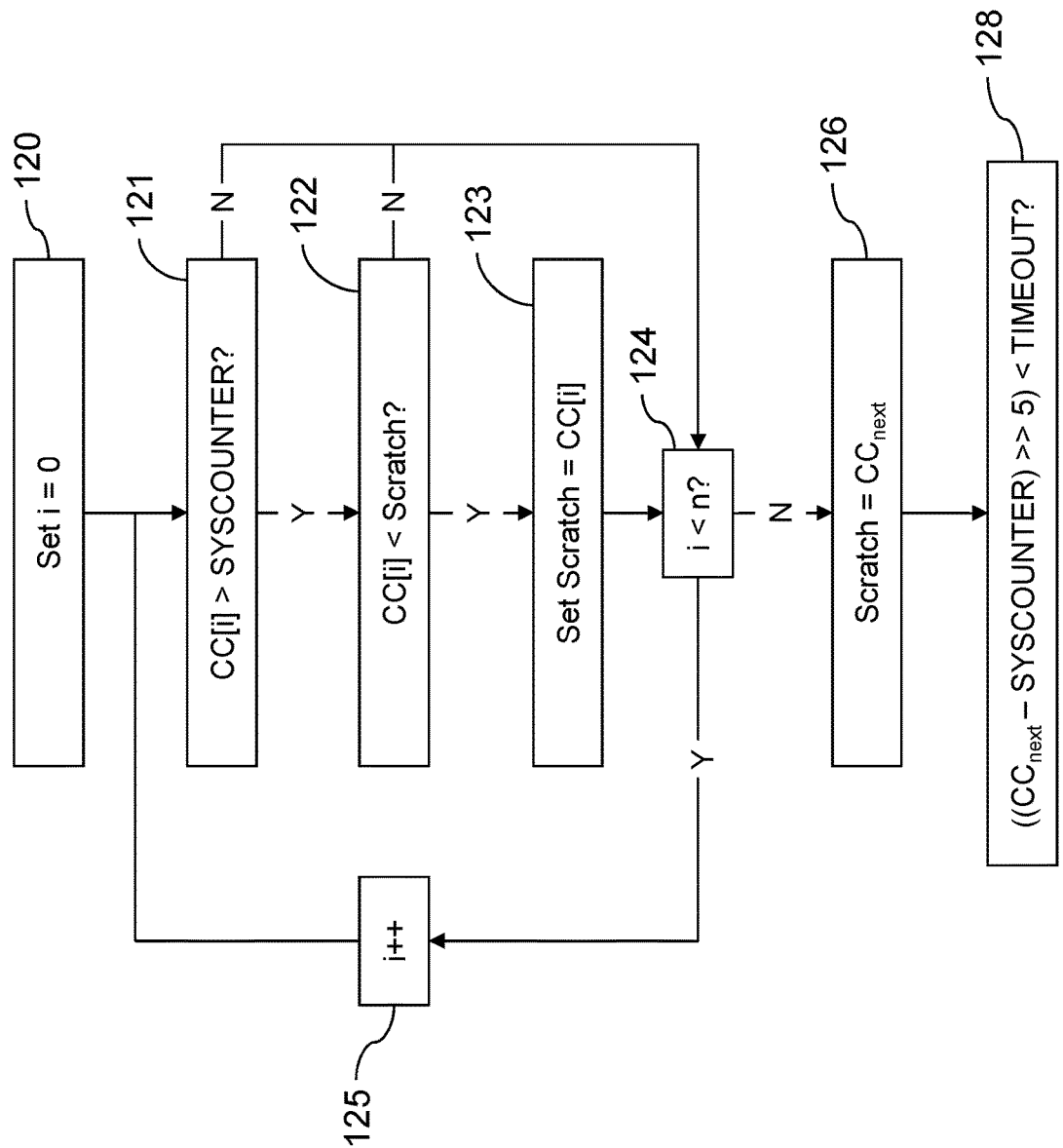
FIG. 5 is a flowchart illustrating the process by which the system timer determines which of a plurality of event registers will trigger next and compares it to a timeout value held in a timeout register.

The process by which the state machine 70 determines which event register 52 will trigger next and compares the value held therein to the timeout value held in the timeout register 74 (step 97 thereof) is illustrated by the flowchart shown in FIG. 5. At step 120, an index variable i is set equal to 0. Then, at step 121, the state machine 70 reads the event register 52 of index i, and compares the value held therein to the value held in the integer portion 36 of the second counter register 34. If the value held in the event register 52 is greater than the value held in the integer portion 36 of the second counter register 34, the state machine 70 proceeds to step 122. If not, the state machine 70 proceeds to step 124.

At step 122, the state machine 70 compares the value held in the event register 52 of index i to the value currently held in the scratch register 40. If the value held in the event register 52 is less than the value currently held in the scratch register 40, the state machine 70 proceeds to step 123. If not, the state machine 70 proceeds to step 124. At step 123, the state machine 70 sets the value held in the scratch register 40 to be equal to the value held in the event register 52 of index i. The state machine 70 then proceeds to step 124.

At step 124, the state machine 70 determines whether the index variable i is less than the total number n of event registers 52. If i<n, the state machine 70 proceeds to step 125. If not, the state machine 70 proceeds to step 126. At step 125, the index variable i is incremented by one, and the state machine 70 proceeds back to step 121. This therefore forms a loop performing steps 121, 122, 123 and 124 for each event register 52 in the set of n event registers 52, steps 122, 123 and 124 being optional in dependence on the value held in the event register 52 in the current iteration of the loop.

Step 126 triggers when i is determined to be greater than or equal to n at step 124. At step 126, the value held in the scratch register 40 is equal to $CC_{next}$—i.e. the value held in the event register 52 that will trigger next—as a result of the iterative loop comprising steps 121, 122, 123, 124 and 125. The state machine 70 then proceeds to step 128, in which the current value held in the integer portion 36 of the second counter register 34 (SYSCOUNTER) is subtracted from $CC_{next}$ (which is held in the scratch register 40), and the result is bit-shifted to the right five times.

This effectively divides the resultant value by $2^5=32$. These operations are performed on-the-fly by combinatorial logic. This bit-shift enables the resultant value to be compared with the timeout value held in the timeout register 74, as the timeout value indicates a number of ticks of the 32 kHz clock signal rather than one in every sixteen ticks of the 16 MHz clock signal as $CC_{next}$ indicates.

The state machine 70 then determines whether the value resulting from these operations is less than the timeout value held in the timeout register 74. If the resultant value less than the timeout value, then this means that the next event register 52 will trigger in a smaller amount of time than that indicated by the timeout value. As a result, the state machine 70 causes the system timer 10 to return to the active state 94. If the resultant value is greater than the timeout value, then the state machine 70 causes the system timer 10 to proceed to synchronise the value held in to the compare register 26 to the value held in the next event register 52 to trigger ($CC_{next}$).

The process illustrated in FIG. 5 requires the timeout value held in the timeout register 74 to be greater than the minimum time required by the system timer 10 to transition from the transition state 96 to the sleep state 90, and then to the active state 94.

Figure 6:
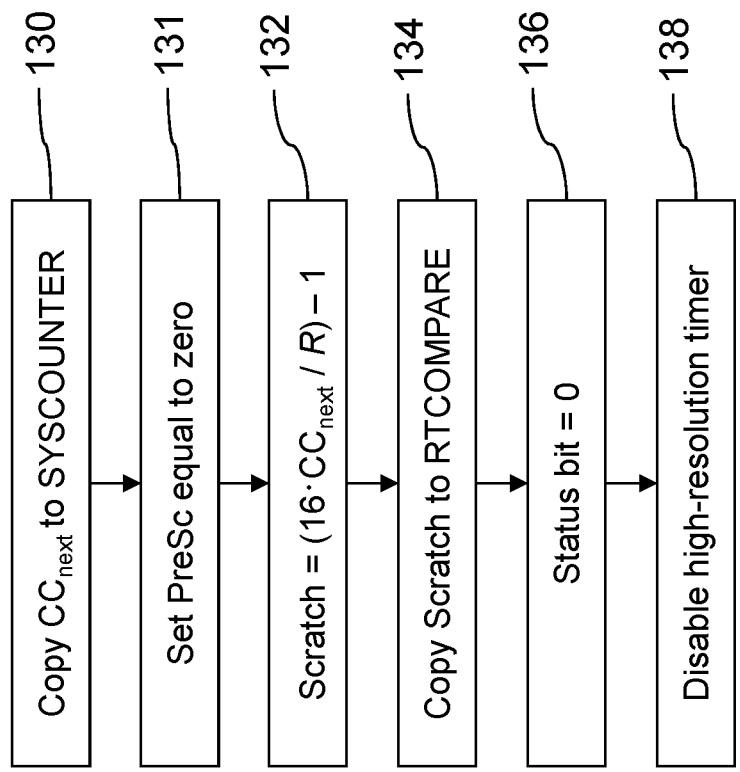
FIG. 6 is a flowchart illustrating the process by which the system synchronises a compare register in the low-resolution timer to the event register determined to trigger next.

The process by which the state machine 70 synchronises the compare register 26 to the next event register 52 to trigger $CC_{next}$ (step 98 of FIG. 3) is illustrated by the flowchart shown in FIG. 6. $CC_{next}$ is held in the scratch register 40 as a result of the operations of FIG. 5 before any steps of FIG. 6 occur. At step 130, $CC_{next}$ is copied from the scratch register 40 to the integer portion 36 of the second counter register 34. At step 131, the fractional portion 38 of the second counter register 34 is set equal to zero. As a result of steps 130 and 131, the value held in the second counter register 34 (i.e. including both the integer portion 36 and the fractional portion 38 thereof) is equal to $CC_{next}$ bit-shifted to the left four times. This value is therefore effectively equal to $16 \cdot CC_{next}$. At step 132 the multiplier logic 42, using the scratch register 40, performs a series of bitwise operations to the value $16 \cdot CC_{next}$ held in the second counter register 34. These bitwise operations effectively multiply the value $16 \cdot CC_{next}$ held in the second counter register 34 by a predetermined multiplicand equal to the ratio between the frequency of the 32 kHz clock signal output by the first oscillator 22 and the frequency of the 16 MHz clock signal output by the second oscillator 32. This ratio is equal to 1/R: the inverse of the previously mentioned frequency ratio R. As the scratch register 40 is used by the multiplier logic 42 to perform these bitwise operations, the resultant value is held in the scratch register 40. Then, the multiplier logic subtracts one from the resultant value held in the scratch register 40 in order to ensure that the compare register 26 triggers an event, and consequently causes the system timer 10 to transition from the sleep state 90 to the active state 94, before the event register 52 holding $CC_{next}$ would trigger had the system timer 10 already been in the active state 94. This operation effectively sets the value held in the scratch register 40 to $(16 \cdot CC_{next}/R)-1$.

At step 134, the value held in the scratch register 40 is copied to the compare register 26. Then, at step 136, the status bit associated with the second counter register 34 is set to zero, thereby indicating that the value held in the second counter register 34 is no longer synchronised to the value held in the first counter register 24 and therefore invalid. Finally, at step 138, the state machine 70 disables the high-resolution timer 30, before causing the system timer 10 to transition to the sleep state 90.

The process by which the tuning register (which comprises a portion of the scratch register 40) and the tuning logic 44 are used to tune the second counter register 34 while the system timer 10 is operating in the active state 94 will now be described in detail. This tuning process assumes that the average drift between the 16 MHz clock signal and the 32 kHz clock signal is at most $1/R \approx 0.2\%$. The tuning register holds a 14-bit value comprising an integer portion and a fractional portion. The integer portion comprises 9-bits, and the fractional portion comprises 5-bits. When the system timer 10 enters the active state 94, the integer portion of the tuning register is set equal to eight, and the fractional portion is set equal to zero.

On each tick of the 16 MHz clock signal, the integer portion of the tuning register decrements by one. On each tick of the 32 kHz clock signal, the value held by the entire tuning register (i.e. including both the integer portion and the fractional portion) is incremented by R<<5, i.e. the ratio R between the frequency of the 16 MHz clock signal output by the second oscillator 32 and the frequency of the 32 kHz clock signal output by the first oscillator 22, bit-shifted to the left five times. If the ratio between the frequencies of the 16 MHz and the 32 kHz clock signals are exactly equal to R, this results in the average value held in the integer portion of the tuning register being equal to eight. If the 16 MHz clock signal is slightly too fast, the value held in the integer portion of the tuning register will gradually decrease. If the 16 MHz clock signal is slightly too slow, the value held in the integer portion of the tuning register will gradually increase.

The tuning logic 44 adds a selectable tuning value to the fractional portion 38 of the second counter register 34 on each tick of the 32 kHz clock signal in dependence on the value held in the tuning register at the time. The tuning logic 44 selects the tuning value to be equal to zero, one, or two. If the value held in the second counter register 34 is determined to be in sync with the value held in the first counter register 24, based on the value held in the tuning register, the tuning logic 44 produces a tuning value of one. This results in a normal increment (i.e. an increment equal to one) of the fractional portion 38 of the second counter register 34. If the value held in the second counter register 34 is determined to be too fast relative to the value held in the first counter register 24, based on the value held in the tuning register, the tuning logic produces a tuning value of zero. This causes the fractional portion 38 of the second counter register 34 to miss one increment (i.e. not increment when it otherwise would have), thereby effectively retarding the second counter register 34. If the value held in the second counter register 34 is determined to be too slow relative to the value held in the first counter register 24, based on the value held in the tuning register, the tuning logic produces a tuning value of two. This causes the fractional portion 38 of the second counter register to increment by two rather than incrementing by one as it would if the first and second counter registers 24, 34 were determined to be in sync. This effectively speeds up the second counter register 34.

In order to perform this functionality, the tuning logic 44 performs a series of bitwise operations on the second, third and fourth least significant bits of the integer portion of the tuning register in order to determine which value to set the tuning value equal to. In effect, these bitwise operations perform the following functions: if the value held in the integer portion of the tuning register is greater than or equal to eight, the tuning value is set equal to two; if the value held in the integer portion of the tuning register is less than eight, but greater than six, the tuning value is set equal to one; otherwise, the tuning value is set equal to zero. This tuning process enables the value held in the second counter register 34 to be maintained synchronised to the value held in the first counter register 24 while the system timer 10 is in the active mode. This increases the long-term timing consistency of the device 1.

By tuning the fractional portion 38 of the second counter register 34 in this manner, the system timer 10 is able to maintain the accuracy of the integer portion 36 of the second counter register 34 without causing it to ever skip forward or back. Instead, if the 16 MHz clock signal and the 32 kHz clock signal's frequencies drift, the time between increments of the integer portion 36 of the second counter register 34 is slightly extended or reduced in dependence on the drift. This helps prevent timing issues in the device 1 that may occur as a result of the integer portion 36 of the second counter register 34 skipping forward or back.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
a plurality of processor cores;
a computer readable storage medium comprising instructions for execution by one or more of the processor cores, each of the instructions being associated with a respective one of a plurality of security settings; and
a system timer comprising:
a first oscillator configured to output a first clock signal at a first frequency;
a first counter register incremented by the first clock signal; and
a plurality of event registers, each event register being configured to trigger an event when a value held therein is determined to be equal to a value held in the first counter register;
wherein
the first counter register is configured to be readable by each of the plurality of processor cores;
each of the processor cores are configured to be capable of writing to at least one of the event registers;
each of the plurality of processor cores is associated with a respective one of a plurality of owner IDs; and
at least one event register is associated with a respective one of the plurality of owner IDs and a respective one of the plurality of security settings, wherein said event register is configured to be writeable to only by a processor core that is associated with said respective owner ID and executing instructions associated with said respective security setting.

2. The device as claimed in claim 1, wherein each event register is configured to trigger an event by generating one or more processor interrupt signals.

3. The device as claimed in claim 1, wherein at least one event register is configured to be writeable to by a plurality of the processor cores.

4. The device as claimed in claim 1 further configured, in response to a processor associated with a respective owner ID and executing instructions associated with a respective security setting attempting to read from or write to an event register that is not associated with said respective owner ID and said respective security setting, to prevent the read or write operation.

5. The device as claimed in claim 1, wherein:
the first counter register is mapped to an upper alias and a lower alias for each respective processor core; and
each processor core is configured to read the first counter register by performing a first read operation on the lower alias, and performing a second read operation on the upper alias.

6. The device as claimed in claim 5, wherein the upper alias of the first counter register for each respective processor core comprises a respective overflow bit indicative of whether or not the respective lower alias overflowed in a time period between the first read operation and the second read operation.

7. The device as claimed in claim 6, where each processor core is configured, if the value of the corresponding overflow bit is indicative of the lower alias having overflowed in the time period between the first and second read operations, to:
perform a third read operation on the lower alias; or
subtract one from the value read from the upper alias in the second read operation.

8. The device as claimed in claim 1, wherein the system timer further comprises a count offset register for storing a configurable count offset value and configured to be writeable to by at least one of the processor cores.

9. The device as claimed in claim 8, wherein the system timer further comprises a summing circuit portion configured to sum a value held in the count offset register and the value held in the first counter register, and to write a resultant value to at least one of the event registers.

10. An integrated-circuit device comprising:
a plurality of processor cores; and
a system timer comprising:
a first oscillator configured to output a first clock signal at a first frequency;
a first counter register incremented by the first clock signal;
a plurality of event registers, each event register being configured to trigger an event when a value held therein is determined to be equal to a value held in the first counter register; and
a count offset register for storing a configurable count offset value and configured to be writeable to by at least one of the processor cores
wherein the first counter register is configured to be readable by each of the plurality of processor cores;

each of the processor cores are configured to be capable of writing to at least one of the event registers; and wherein each of the processor cores are configured to write to an event register by writing a count offset value to the count offset register and transmitting a signal indicating the event register to be written to.

11. An integrated-circuit device comprising:

a plurality of processor cores; and a system timer comprising:

a first oscillator configured to output a first clock signal at a first frequency;

a first counter register incremented by the first clock signal;

a plurality of event registers, each event register being configured to trigger an event when a value held therein is determined to be equal to a value held in the first counter register;

a high-resolution timer comprising the first oscillator and the first counter register; and a low-resolution timer comprising a second oscillator configured to output a second clock signal at a second frequency and a second counter register incremented by the second clock signal, the second frequency being less than the first frequency;

wherein the first counter register is configured to be readable by each of the plurality of processor cores;

each of the processor cores are configured to be capable of writing to at least one of the event registers;

the device is configured to operate in one of a plurality of states, the plurality of states comprising:

an active state in which both the high-resolution timer and the low-resolution timer are enabled; and a sleep state in which the high-resolution timer is disabled and the low-resolution timer is enabled; and the device is configured to transition from the sleep state to the active state, said transition comprising writing a value to the first counter register based on a value held in the second counter register.

12. The device as claimed in claim 11, wherein the second counter register is configured not to be readable by any processor core.

13. The device as claimed in claim 11, wherein the plurality of states further comprises a transition state in which both the high-resolution timer and the low-resolution timer are enabled, and in which the device is configured to determine whether to transition to the sleep state or to the active state.

14. The device as claimed in claim 11 further comprising a compare register configured to cause the device to trigger an event when a value held therein is determined to be equal to a value held in the second counter register.

15. The device as claimed in claim 14 configured, when in a transition state, to:

determine a smallest value held in any of the event registers that is greater than the value held in the second counter register;

determine whether to transition to the sleep state in dependence on said smallest value; and transition from the transition state to the sleep state, said transition comprising writing a value derived from the determined smallest value to the compare register.

16. The device as claimed in claim 14 further comprising a control register having a plurality of bits which are each associated with a respective one of a plurality of owner IDs and a respective one of a plurality of security settings such that the respective bit is configured to be writeable to only by a processor core that is associated with said respective owner ID and executing instructions associated with said respective security setting.

17. The device as claimed in claim 16 configured to transition from the sleep state to the active state in response to one or more active conditions being met, the active conditions comprising:

any bit of the control register being enabled; and/or any of the event registers being written to; and/or a value held in the compare register being determined to be equal to a value held in the second counter register; and/or the first counter register being read.

18. The device as claimed in claim 1, wherein the plurality of processor cores do not comprise a local counter register.

19. The device as claimed in claim 1, wherein the first counter register is configured to not be writeable to by any of the processor cores.

* * * * *